US006609679B1

(12) United States Patent
Seidel

(10) Patent No.: US 6,609,679 B1
(45) Date of Patent: Aug. 26, 2003

(54) COMPONENT MOUNTING PERMITTING ONE HAND INSTALLATION

(75) Inventor: Greg A. Seidel, Eagan, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 10 days.

(21) Appl. No.: 09/722,169

(22) Filed: Nov. 24, 2000

(51) Int. Cl.$^7$ .............................................. B64D 43/00
(52) U.S. Cl. ................. 244/1 R; 248/222.13; 361/657; 361/747; 361/759
(58) Field of Search ...... 248/222.13; 403/109.1–109.5; 361/657, 747, 759; 244/1 R

(56) References Cited

U.S. PATENT DOCUMENTS

| 4,352,511 | A |   | 10/1982 | Ribble et al. ................. 285/91 |
| 4,523,385 | A | * | 6/1985  | Robinson et al. ........... 403/109 |
| 4,562,978 | A | * | 1/1986  | Durbin et al. ............... 244/1 R |
| 5,201,109 | A |   | 4/1993  | Harding ........................ 29/451 |
| 5,234,295 | A | * | 8/1993  | Jackson et al. |
| 6,029,940 | A | * | 2/2000  | Klein ..................... 248/222.12 |
| 6,138,968 | A | * | 10/2000 | Svantesson et al. ... 248/222.13 |

FOREIGN PATENT DOCUMENTS

DE            23 52048 A1     4/1975

* cited by examiner

Primary Examiner—Charles T. Jordan
Assistant Examiner—Lulit Semunegus
(74) Attorney, Agent, or Firm—Westman, Champlin & Kelly, P.A.

(57) ABSTRACT

A pair of mating components that are in very close quarters and which require essentially one-handed installation of a moveable part or component relative to a fixed part having mating linear wedge type ramps. The ramps on the moveable part will permit movement of the moveable part adjacent the fixed part, so that surfaces of the ramps on the movable part overlap ramps on the fixed part. Lateral movement of the moveable, part causes the ramp surfaces to engage to support the moveable part. The moveable part then can be clamped by further lateral movement so that the wedge type ramps urge the two parts to mate and seat.

11 Claims, 6 Drawing Sheets

COMPONENT MOUNTING PERMITTING ONE HAND INSTALLATION

BACKGROUND OF THE INVENTION

The present invention relates to a mounting arrangement for holding two separable, mating parts securely locked together and permitting one part to be assembled to the other with one hand. A fixed mounting part has linear cam like ramps or wedges oriented so that when mating the parts, mating linear cam like ramps or wedges on a removable part are placed on the linear ramps on the fixed part, and the removable part is slid in a first direction. The linear ramps act to move the parts together to seat the removable part so it is locked in place. Initially a spring provides a force to slide the linear ramps or wedges together and hold the parts in an initial position, and subsequently the removable part is manually tightened into position.

In many hard to reach areas, particularly in aircraft, it is necessary to provide removable components such as circuit housings, or transducers, that mate with fixed components. The mating parts must be accurately seated and reliably secured. Because of limited space, access to many areas is so limited that only one hand can be used for installation or removal of the removable part. Because of the need for proper alignment of ports or connections and tight sealing, and because the installation may well be "blind", screw on connections are not fully satisfactory because the rotational position cannot be easily observed.

Reliable, accurate and secure mounting of a removable part or component using only one hand is needed.

SUMMARY OF THE INVENTION

The present invention provides a mounting arrangement for mounting a removable part or component to a mating fixed part using only one hand. Mating linear ramps or wedges are provided on the two parts. In a first position the mating linear ramps or wedges on the removable (or movable) part are positioned so the linear ramps on the two parts will move past each other when the removable part is slid laterally so the ramps are at least partially overlapping. The removable part ramps will be supported on the fixed ramps. As shown, a slide frame is fixed to the removable part and carries the ramps for that part, and the slide frame fits around at least a portion of the fixed part. After initial assembly, a clamp screw on the slide frame acts against a pusher engaging the fixed part to slide the frame and movable ramps or wedges along the fixed ramps or wedges to clamp the two parts together.

For initial assembly, if desired, a spring acting between the pusher and slide frame is compressed so the slide frame can be shifted to permit the removable part to be placed in position where the ramps on the removable part can slip by the fixed ramps. The removable part is then moved toward the fixed part so the ramps on the slide frame are at a level to permit overlapping the ramps on the fixed part. When the removable part is released the spring will urge the ramps to slide into registry and when the surfaces of the movable and fixed ramps overlap and engage, the removable part is supported on. the fixed part in a partially assembled position. The removable part is held in position by the spring force, so the one hand holding the removable part, can be moved, while the parts remain in a partially assembled position. The clamp screw is then operated with one hand to pull the movable component or part laterally. The ramps on the slide frame slide along the fixed ramps so that the parts are moved together by the ramping or camming action. The clamp screw is used to clamp and lock the parts together.

A user thus can attach a removable component or part to a flange or other fixed component or part with considerable clamping and holding force while using only one hand. The mounting mechanism is useful in many applications where blind or hard to access mounting locations do not allow a person installing the removable component or part to use both hands, and further is useful where high clamping force may be required to hold the parts assembled.

DETAILED DESCRIPTION OF THE PREFERRED EMBODIMENTS

Figure 1:
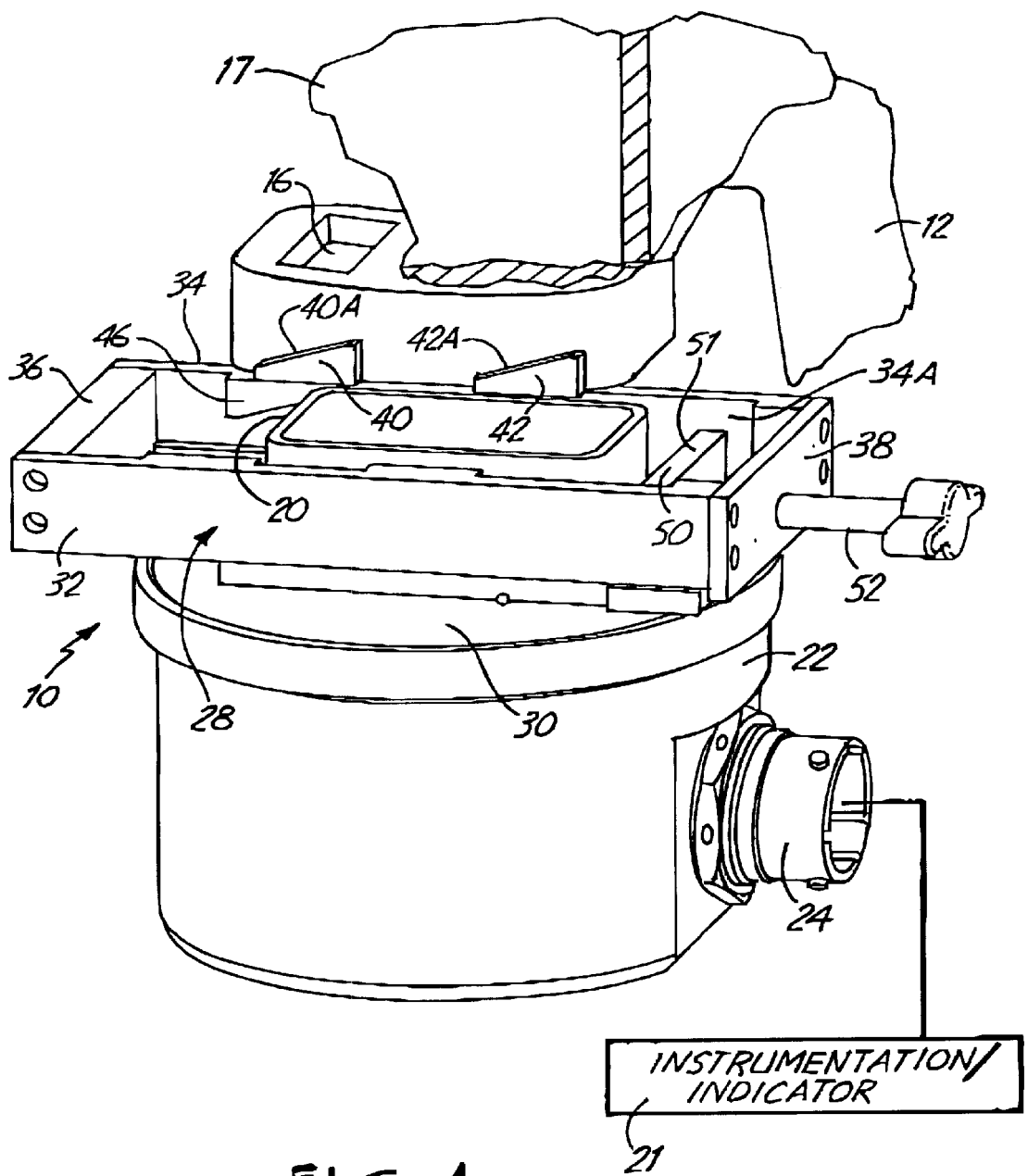
FIG. 1 is a perspective view of a pair of mating parts or components in an initial position for installation and having the ramp mounting members of the present invention.

An aircraft instrumentation assembly indicated generally at 10 is a two-part or two component assembly that have the one hand installation features of the present invention. In the showing in FIG. 1, an aircraft body that is illustrated only schematically at 12 has a fixedly mounted component, such as a water tank fitting or manifold 14 for a passenger drinking water tank 17 supported in a position where it is extremely difficult to use two hands for coupling a mating part to the fixed part. The location could be under a cowling, or along an interior side of an aircraft, or under a spar or stringer or the like. The fixed tank, manifold 14 has a port or opening 16 under which a water level sensor 19 mounts. The sensor shown is an ultrasonic sensor that measures water level in tank 17. The tank manifold 14 couples to a mating, removable manifold section 20 of an instrument package or component 22. The instrument package or component 22 may include necessary circuitry to provide an electrical signal proportional to water level in the tank. The instrument component 22 has an electrical fitting 24 that would be connected to suitable wiring for carrying signals to signal conditioning equipment or to an onboard indicator 21.

The removable and replaceable part or component 22 (also called the movable part) is supported in an outer slide rail frame assembly 28, which is slidable relative to an upper end 30 of the removable component or instrumentation package 22. The slide frame is slidably mounted on a pusher block 50 that is fixed to the part or component 22, as will be explained.

The slide rail frame assembly 28 includes a pair of side rails 32 and 34 which are spaced apart, and which have the mating manifold part 20 positioned between them. In the form shown, the side rails 32 and 34 are held together with an end wall 36 at one end to maintain them spaced, and a reaction cross wall or block 38 is attached to and extends between the side rails 32 and 34 at the other end of the slide frame.

Figure 2:
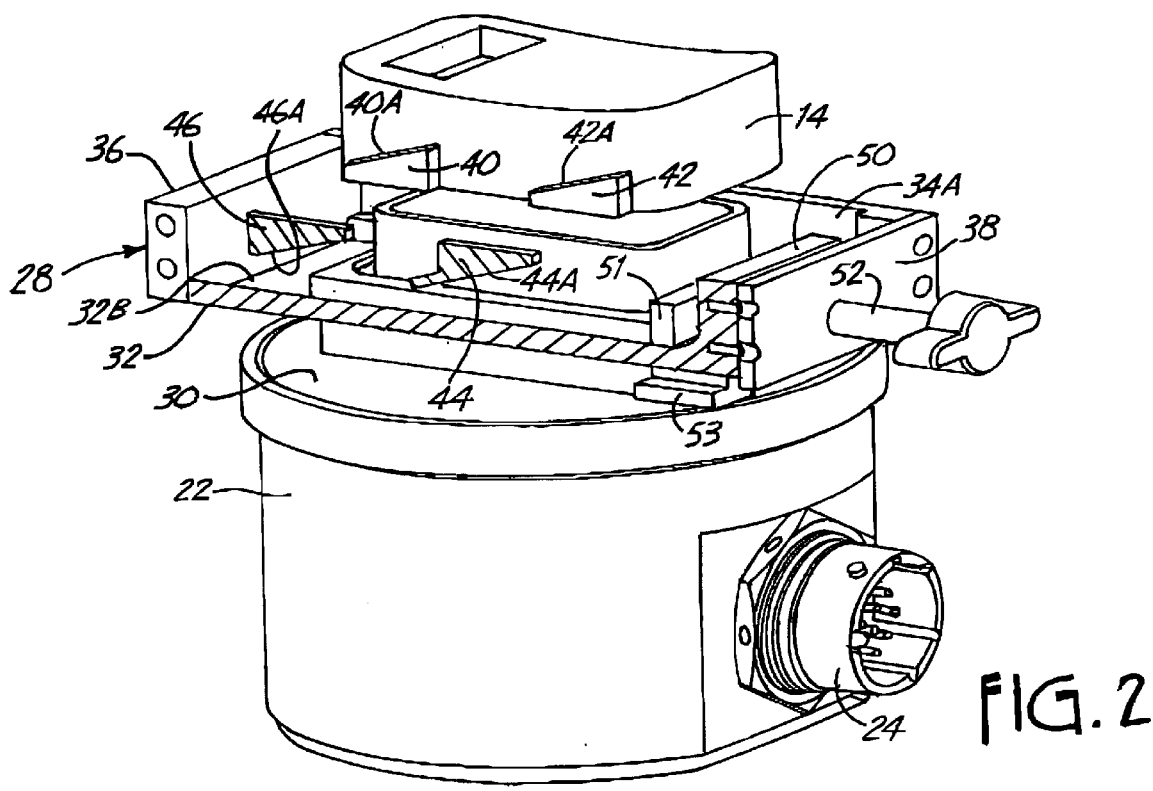
FIG. 2 is a perspective view, similar to FIG. 1 with parts in section and parts broken away.

The fixed manifold 14, as shown, has cam type ramps or wedges 40 and 42 on each side of the manifold. The ramps 40 and 42 are aligned transversely as pairs on the manifold. The ramps 42 are spaced from the ramps 40 a selected distance. The ramps 40 and 42 have inclined linear cam or ramp surfaces 40A and 42A that are upwardly facing, as shown in FIG. 2.

The slide frame side rails 32 and 34 are recessed at shown at 32A and 34A to provide for side clearance of the fixed ramps 40 and 42 and to provide support track surfaces for the pusher block 50. A pair of cam type ramps or wedges 44 are fixed to and positioned transversely aligned on the side rails 32 and 34. The ramps or wedges 44 are of size to fit or pass vertically between the ramps 40 and 42 on the fixed manifold 14.

Additionally, a second pair of cam type ramps or wedges 46 are formed on or fixed to the side rails 32 and 34, so that there are mating ramps 44 and 46 on the slide frame assembly 28 that will mate with the ramps 40 and 42 on the fixed component or manifold 14.

The pusher block 50 is provided with ears 51 that slidably support the slide frame 28 through upper surfaces of tracks 32B and 34B which are formed by recesses 32A and 34A in the side slide rails 32 and 34. The pusher block 50 also has support guide ears 53 that slidably support the lower sides of the side rails 32 and 34. The pusher block 50 is fixed to the removable component 22 in a suitable manner and the slide frame assembly 28 can thus be slid along the pusher block 50. It can be seen that when the ramps 44 and 46 are above the ramps 42 and 40, and the slide frame 28 and ramp 44 and 46 are moved to the right in FIGS. 1–4, the facing ramp surfaces overlap and urge the parts together with a wedge action.

Movement of the slide frame 28 relative to pusher block 50 is caused in two ways. A spring 56 is positioned between the pusher block 50 and end wall or block 38 of the slide frame. One end of the spring 56 mounts in a recess 54 in wall 38 and the other end of the spring 56 fits around a boss 58 on pusher block 50. The spring 56 will urge the end wall 38 of slide frame 28 away from the pusher block 50.

Also, a clamp screw 52 threads through the end wall or block 38, and can be threaded so the end will bear against the pusher block 50 to load the slide frame in a direction to slide the ramps or wedges together to force the two parts or components to mate. The screw 52 is not attached to the pusher block 50, but the end of the screw will bear on the boss 58 of the pusher block 50.

Figure 3:
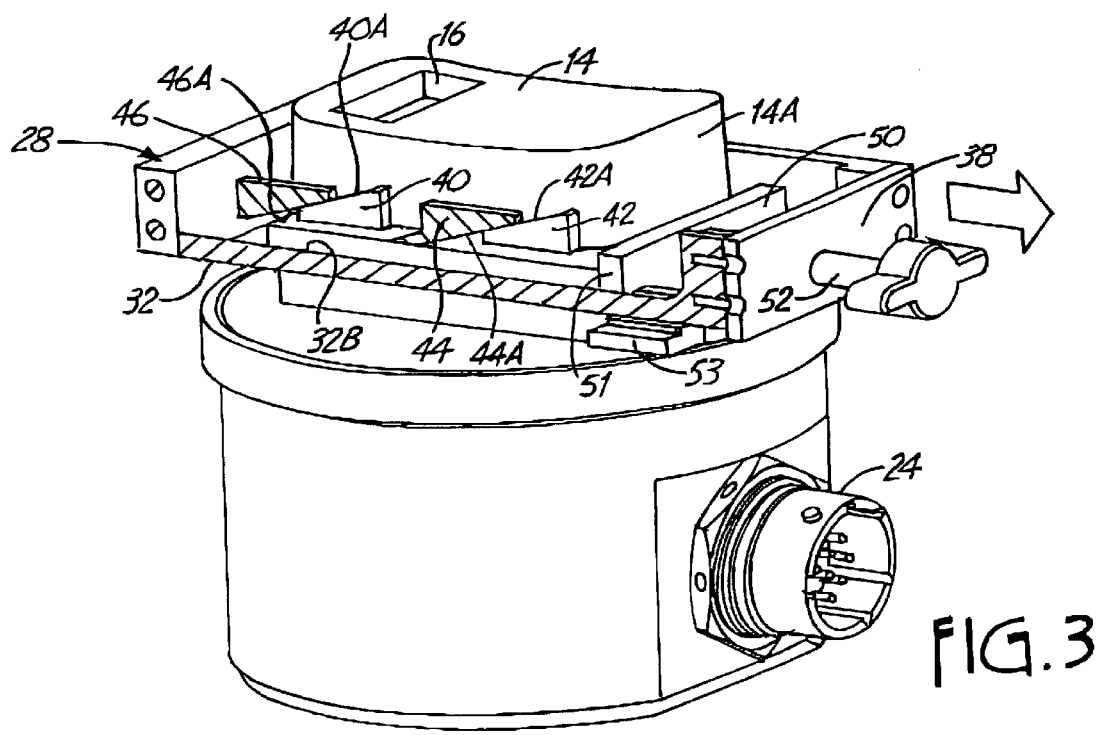
FIG. 3 is a perspective view similar to FIG. 2 showing the parts partially assembled.
Figure 4:
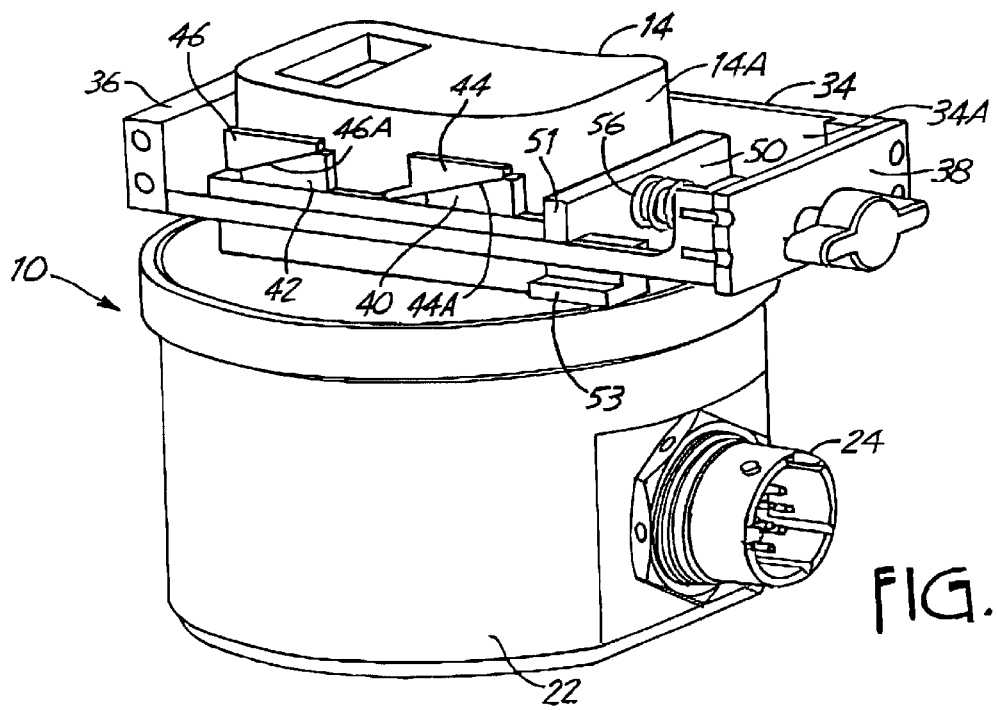
FIG. 4 is a view similar to FIG. 3 showing the parts after assembly.
Figure 5:
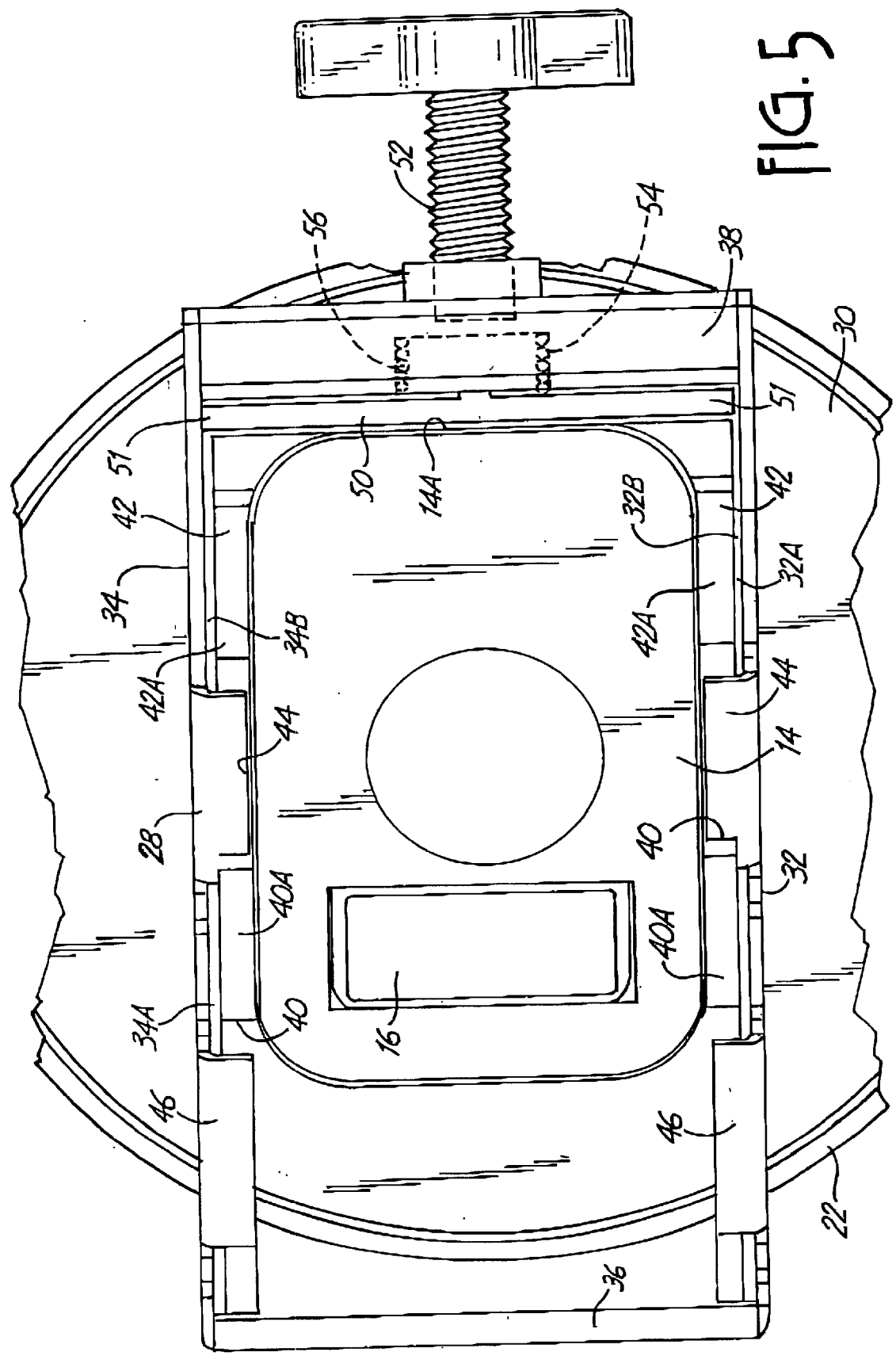
FIG. 5 is an enlarged top plan view of a slide frame and fixed component used for assembly in position corresponding to FIG. 2, at an initial installation position.
Figure 6:
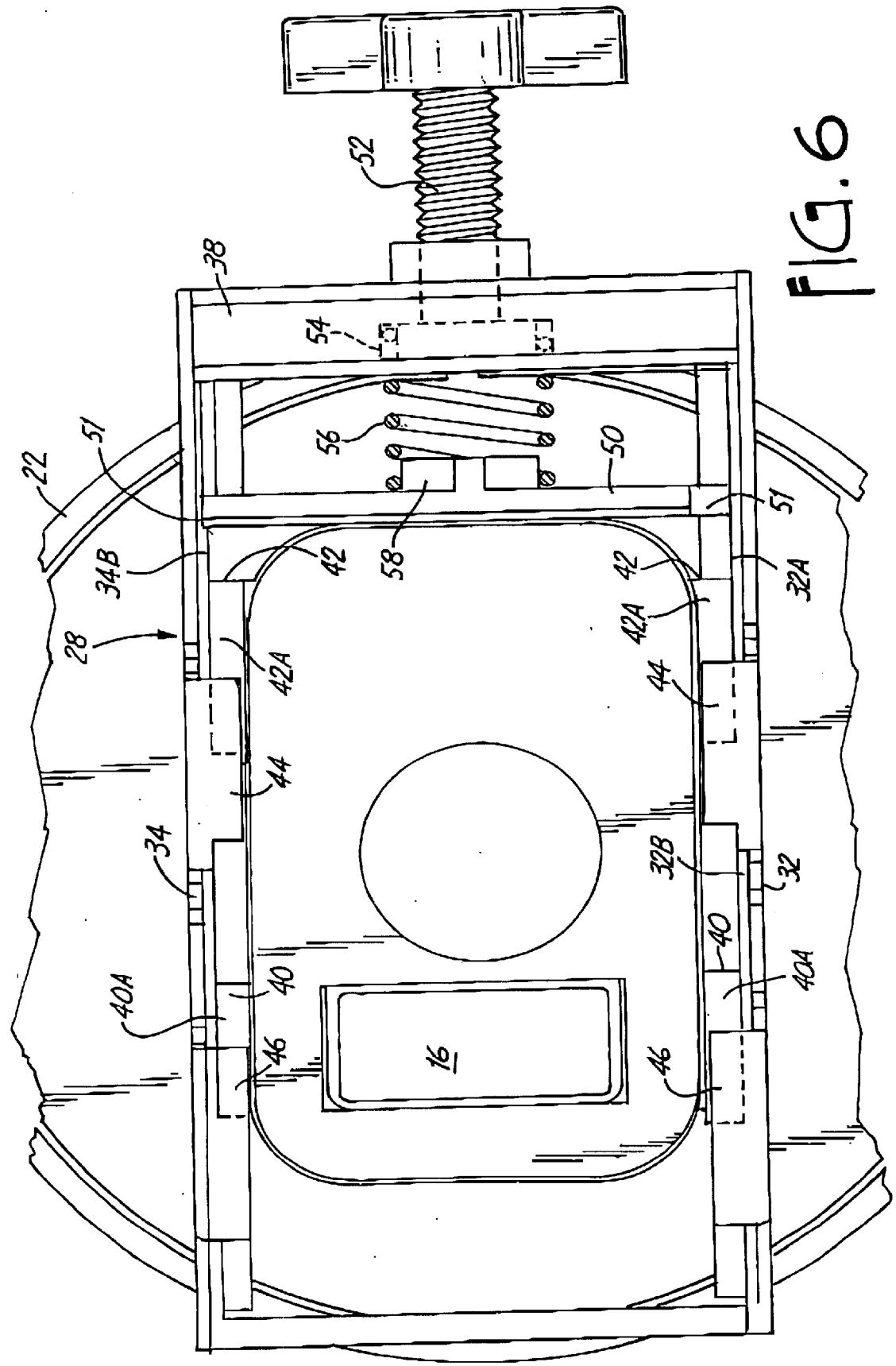
FIG. 6 is a plan view similar to FIG. 5, with the parts partially assembled as shown in FIG. 3.

For one handed installation, the removable component 22, the pusher block 50 and slide frame assembly 28, will be set by retracting the clamp screw 52 to position shown in FIGS. 3, 5 and 6. This will permit the wall 38. to be manually moved toward pusher block 50 as the spring 56 is compressed. The slide frame assembly 28 can be moved so wall 38 and block 50 are close, or touching, as shown in FIGS. 2 and 5 in a ready position. The slide frame 28 and removable part or component 22 are then positioned below the fixed part or manifold 14 and the pusher block 50 and slide frame 28 are gripped with one hand and the parts are held as shown in FIGS. 2 and 5. The removable part is moved to the position shown in FIGS. 1, 2 and 5, so that the movable ramps or wedges 44 and 46 are offset from the fixed ramps 40 and 42 and the removable part 22 can be lifted to a level so ramps 44 and 46 are above the ramps or wedges 40 and 42.

With the removable part 22 up in a position so that the manifold portion 20 is adjacent the manifold 14, the leading (small) ends of ramps or wedges 44 and 46 will be above the small ends of ramps or wedges 44 and 40 and as the removable part or component 22 is held in this position, the slide frame 28 is released from its ready position so that the spring 56 will urge the wall 38 to separate from pusher block 50 and move ramps 44 and 46 to position as shown in FIGS. 3 and 6 partially overlying the fixed ramp or wedges. The removable component or part 22 will thus be supported on the ramps 40 and 42 of the fixed manifold 14.

Figure 7:
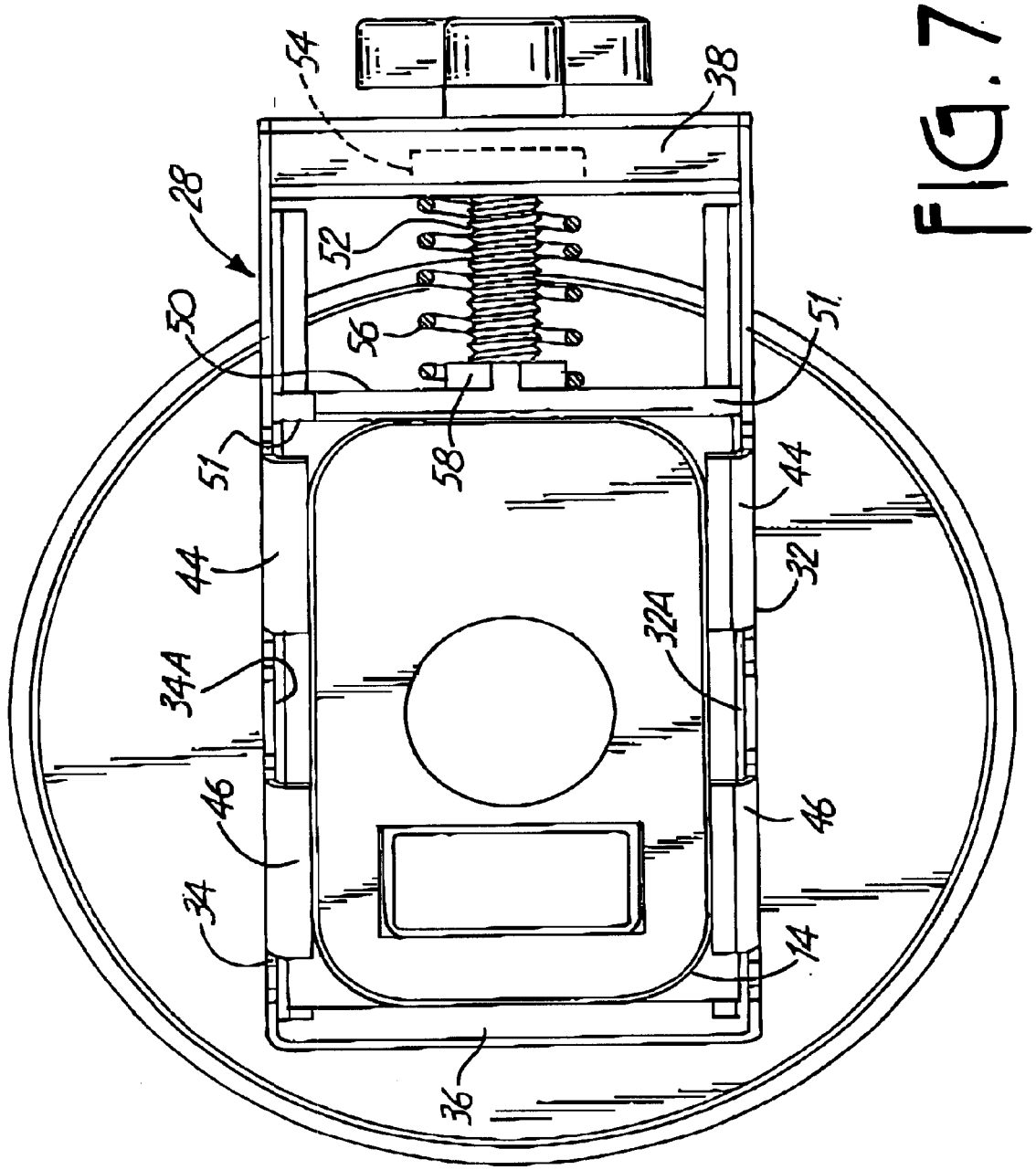
FIG. 7 is a plan view of the slide frame and parts in a fully installed position.

Then, the same hand that was used for supporting the component or instrument package 22 and holding the slide frame retracted, can be used for threading the clamp screw 52 so it bears on pusher block 50 to urge the slide frame wall 38 away from block 50. Of course, if desired the other hand can be used for threading clamp screw 52. The tapered linear cam type surfaces 44A and 46A of ramps 44 and 46 will slide along surfaces 42A and 40A to move the removable component or part 22 up tightly against the under surface of the manifold 14. A tight seal can be obtained and the parts will be locked together, as shown in FIG. 7. By moving the clamp screw 52 until the torque required to rotate the screw is high enough or until the end block or wall 36 of the slide frame rests against the rear side or rear wall surface of the fixed part or manifold 14, it is known that the removable part is tightly sealed, properly positioned and is locked in position by the force applied to the clamp screw 52.

One-handed installation is easily accomplished, even in very tight places where there is a "blind" opening for installation. Removal of component 22 is a reverse of the process. The clamp screw 52 would be backed off and the slide frame moved to disengage the ramps or wedges, using one hand.

Other forms of ramps, wedges or cams can be utilized. It is desired to use camming members that will align or be properly positioned for engagement upon a linear movement of the removable part toward the fixed part or component, and then the two parts will tighten up upon movement laterally to the linear mating movement so that the cams, ramps or wedges tighten the two parts together.

Preferably, a final tightening adjustment is made manually with a single hand to hold the parts securely together and locked in position.

The present disclosure has shown a connection of an ultrasonic level sensor to a water tank fitting or manifold, but other instruments or components also can be connected using the cam type ramps. External pitot-static pressure sensors, angle-of-attack sensors, and temperature sensors used on aircraft are coupled to manifolds on which instrument components are mounted. One handed installation is beneficial for such instruments as well.

Although the present invention has been described with reference to preferred embodiments, workers skilled in the art will recognize that changes may be made in form and detail without departing from the spirit and scope of the invention.

What is claimed is:

1. In a two component separable assembly comprising a first part and a second part, a support system including a first pair of cam type fixed ramps on the first part, a second pair of cam type mating ramps fixed on the second part, said first and second cam type ramps being relatively oriented so that upon movement of the second part toward the first part in a first direction one of the second pair of cam type ramps moves between the first pair of cam type ramps and both of the second cam type ramps are positioned to engage one of the first cam type ramps, and upon movement of the second part laterally of the first direction the second pair of cam type ramps engage the first pair of cam type ramps, respectively, to support the second part on the first part and the first and second parts are moved together to a mating position by the lateral movement.

2. The assembly of claim 1 including an actuator for moving the second part laterally relative to the first part to urge the cam type ramps together and to urge the parts to the mating position.

3. The assembly of claim 1, wherein said cam type ramps have planar inclined actuating surfaces and upon relative movement of the components laterally, the actuating surfaces slide relative to each other to move the components together.

4. The assembly of claim 1, further comprising a slide frame that surrounds a portion of the second part and has side rails, a separate pair of second cam type ramps on each side rail, and said first part having a separate pair of first cam type ramps on opposite sides thereof to mate with the pairs of second cam type ramps on the side rails of the slide frame.

5. The assembly of claim 2, wherein said actuator comprises a block, a screw threadably mounted into a portion of the slide frame, said screw moving the portion of said slide frame away from said block as the cam type ramps mate and slide to move the second part to the mating position with the first part.

6. The assembly of claim 5 and a bias member urging the slide frame to move in a first direction relative to the block.

7. In an assembly of two parts, one of which is movable relative to the other, and wherein the parts are movable together upon movement along a first axis and mate together when the parts are moved in a lateral direction relative to the first axis to a mating position, the improvement comprising separate pairs of complementary ramps fixed on the respective parts that are positioned to engage when the parts are moved together along the first axis so that upon movement of the parts in the lateral direction the separate pairs of ramps on the parts engage and the parts are moved to their mating position.

8. The improvement of claim 7, wherein said parts comprise aircraft parts.

9. The improvement of claim 7, wherein said ramps comprise linear actuating surfaces that slide relative to each other to move the two parts together.

10. An aircraft instrument including a fixed part on an aircraft, and a removable part to mate with the fixed part, a first pair of wedges fixed to the fixed part and spaced apart along a first line extending in a first orthogonal direction, the first pair of wedges each having a first ramp surface that is inclined relative to the line and extends in the direction of the line and faces in the same direction as another first ramp surface relative to the line, a second direction perpendicular to the line being an axis along which the removable part is moved to engaged the fixed part, a second pair of mating wedges fixed on the removable part, and spaced apart along a line at a spacing substantially the same as the spacing of the first pair of wedges, the second pair of wedges each having a second ramp surface inclined relative to the second line and extending in the direction of the second line and facing in the same direction as another second ramp surface relative to the second line, said removable part being positionable along the axis at a first position so that each of the second wedges is adjacent a separate one of the first wedges, and the ramp surfaces of the first and second wedges are facing in directions toward each other and have portions aligned at a level to overlap in direction along the first line, the removable part being movable in direction along the first line so that the wedge surfaces move into registry and engage and move the movable part toward the fixed part.

11. The aircraft instrument of claim 10, wherein the removable part has a slide frame thereon and the second pair of wedges being on the slide frame, said slide frame being slidable relative to the removable part in the direction transverse to the axis, the lateral movement being in a first lateral direction to move the two parts together, a pusher block fixed to the removable part and a spring urging the slide frame to separate from the pusher block, said slide frame being movable against the force of the spring to a ready position wherein the slide frame is in a position permitting the removable part to be moved to its first position, and the spring moving the slide frame to cause the wedge to move together when the slide frame is released from its ready position.

* * * * *